(12) United States Patent
Dahmer

(10) Patent No.: US 9,387,870 B2
(45) Date of Patent: Jul. 12, 2016

(54) LOADING APPARATUS FOR AN ENGINE-POWERED, WHEELED MACHINE AND METHOD OF MANUFACTURING SAME

(71) Applicant: Bullet Enterprises, LLC, Sheboygan, WI (US)

(72) Inventor: Bradley Michael Dahmer, Sheboygan Falls, WI (US)

(73) Assignee: Bullet Enterprises, LLC, Sheboygan, WI (US)

(*) Notice: Subject to any disclaimer, the term of this patent is extended or adjusted under 35 U.S.C. 154(b) by 252 days.

(21) Appl. No.: 14/250,559

(22) Filed: Apr. 11, 2014

(65) Prior Publication Data

US 2015/0291199 A1     Oct. 15, 2015

(51) Int. Cl.
  *B62B 5/00*      (2006.01)
  *B62B 5/06*      (2006.01)
  *E01H 5/04*      (2006.01)
  *A01D 101/00*    (2006.01)

(52) U.S. Cl.
  CPC .............. *B62B 5/0003* (2013.01); *B62B 5/067* (2013.01); *E01H 5/04* (2013.01); *A01D 2101/00* (2013.01)

(58) Field of Classification Search
  CPC ... A01D 34/824; A01D 34/90; A01D 34/001; A01D 34/08; A01D 2101/00; B62B 5/0003; B62B 5/067; E01H 5/04
  USPC ...................................... 56/DIG. 18; 37/244
  See application file for complete search history.

(56) References Cited

U.S. PATENT DOCUMENTS

| | | | | |
|---|---|---|---|---|
| 1,084,165 A | * | 1/1914 | Page | 16/437 |
| 1,308,909 A | * | 7/1919 | Landon | 56/255 |
| 1,368,506 A | * | 2/1921 | Kezon | B61K 5/06 104/267 |
| 2,490,870 A | * | 12/1949 | Heyn | A01D 34/63 172/42 |
| 2,705,859 A | * | 4/1955 | Burg | A01D 34/475 180/19.3 |
| 2,913,249 A | | 11/1959 | Welsh | |
| 3,555,583 A | | 1/1971 | Mousel | |
| 3,649,976 A | | 3/1972 | Isom | |
| 3,743,313 A | * | 7/1973 | Koch | A01D 34/824 16/437 |
| 3,855,763 A | * | 12/1974 | Seifert | A01D 34/63 16/437 |
| 4,006,914 A | * | 2/1977 | Koch | A01D 34/824 16/437 |
| 4,108,456 A | | 8/1978 | Woelffer et al. | |
| D274,250 S | | 6/1984 | Allen et al. | |
| 4,528,805 A | | 7/1985 | Zitta | |
| 4,551,967 A | | 11/1985 | Murcko | |

(Continued)

*Primary Examiner* — Jamie L McGowan
(74) *Attorney, Agent, or Firm* — Ziolkowski Patent Solutions Group, SC

(57) ABSTRACT

A loading apparatus is coupleable to an engine-powered, wheeled machine, such as a snow blower or lawnmower, to aid in lifting the machine onto and off of raised platforms and up and down stairs. The loading apparatus includes a handle assembly having a first arm and a second arm, a first side support member having a first end sized to receive the first arm, and a second side support member having a first end sized to receive the second arm. The apparatus also includes attachment brackets coupled to respective upper portions of the first and second side support members, and attachment brackets coupled to respective lower portions of the first and second side support members. The first and second arms of the handle assembly slidably engage the first and second side support members and are moveable therein between a retracted position and an extended position.

22 Claims, 10 Drawing Sheets

(56) References Cited

U.S. PATENT DOCUMENTS

| | | |
|---|---|---|
| 4,561,239 A | 12/1985 | Cook |
| 4,763,907 A | 8/1988 | Raymond |
| D305,603 S | 1/1990 | Nelson et al. |
| 4,966,259 A | 10/1990 | Bergman |
| 5,040,315 A | 8/1991 | Matson |
| D323,831 S | 2/1992 | Hollis |
| 5,180,141 A | 1/1993 | Hunt |
| D343,997 S | 2/1994 | Smith |
| 5,307,612 A * | 5/1994 | Tomiyama ............. A01D 34/68 56/11.1 |
| D347,981 S | 6/1994 | Suggs, Sr. |
| D363,588 S | 10/1995 | Bancroft et al. |
| D367,347 S | 2/1996 | Moudrianakis |
| 5,775,074 A | 7/1998 | Walter |
| 5,842,329 A | 12/1998 | Carter |
| 5,966,846 A | 10/1999 | Harms et al. |
| 6,123,209 A | 9/2000 | Tseng |
| 6,341,406 B1 | 1/2002 | Beckman |
| D471,337 S | 3/2003 | Cooper |
| D473,569 S | 4/2003 | Abenroth |
| D529,931 S | 10/2006 | Henssler et al. |
| D589,224 S | 3/2009 | Kilpatrick |
| 7,644,565 B2 | 1/2010 | Uihlein |
| D622,567 S | 8/2010 | Maldonado et al. |
| D662,273 S | 6/2012 | Bayley |
| D676,876 S | 2/2013 | Martin et al. |
| D748,360 S * | 1/2016 | Dahmer ........................ D34/28 |
| 2001/0039788 A1 | 11/2001 | Starr |
| 2007/0158289 A1 | 7/2007 | Chen |
| 2009/0094956 A1 | 4/2009 | Barlow et al. |
| 2015/0096953 A1 | 4/2015 | Lai |

* cited by examiner

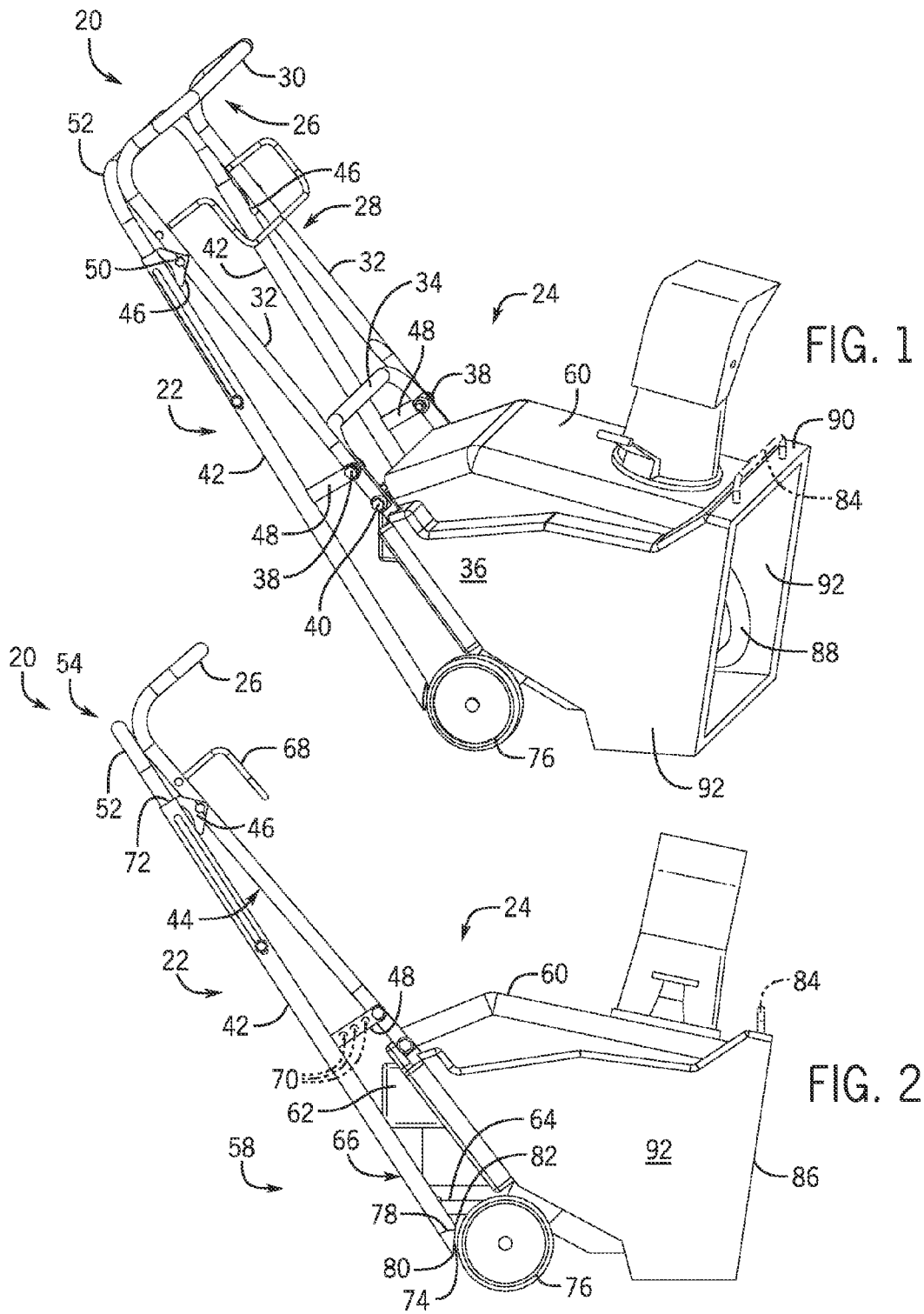

LOADING APPARATUS FOR AN ENGINE-POWERED, WHEELED MACHINE AND METHOD OF MANUFACTURING SAME

BACKGROUND OF THE INVENTION

Embodiments of the invention relate generally to mechanisms for lifting engine-powered, wheeled machines to or from raised platforms and, more particularly, to a loading apparatus coupleable to an engine-powered, wheeled machine to facilitate loading and unloading of the machine from a raised platform without causing damage to structural components of the machine.

Engine-powered, wheeled machines are commonly lifted to platforms for storage or transport manually by an operator. However, the machines can be heavy and typically do not include convenient gripping locations. As a result, the operator is often forced to assume an awkward position when lifting the machine. The combination of the awkward lifting position and weight of the machines puts a strain on the operator that may lead to overexertion and injury.

Snow blowers and lawn mowers are two examples of engine-powered, wheeled machines that are frequently manually lifted onto and off of raised locations by an operator. The machines are often lifted after each use to shelves for storage or onto trucks for transport. Employees of lawn care and snow removal businesses, for example, may lift the machine onto and off of a pickup truck several times in one shift for transport to each customer's home or business. In addition, some machines are likely to be used during inclement weather, like snow blowers in a snow storms, leading to unsafe lifting conditions. As a result, the repeated lifting of engine-powered, wheeled machines has the potential to cause fatigue and injury.

In addition to the injuries to the operator resulting from repeated loading and unloading of engine-powered, wheeled machines, the machine itself is often damaged during a loading or unloading event. For example, rather than lifting the machine off the back of a pickup truck and placing the machine on the ground, the operator may attempt to slide the machine off of the back bed of the pickup truck or simply drop the machine down onto the ground as a result of operator fatigue or the weight of the machine. Such actions may damage the machine and may possibly cause injury to the operator. First, engine-powered machines such as snow blowers often include engine components that extend outward from the back end of the machine. If any of these engine components get caught on the pickup truck gate or bed during the loading event, the operator could be stuck in an awkward position supporting a heavy machine. In either situation, the operator person could be injured and the components damaged. Further, the force of dropping the heavy machine onto the ground may cause components of the machine to break.

Therefore, it would be desirable to design an apparatus and method to aid in lifting engine-powered, wheeled machines to and from a raised platform. Further, it would be desirable to have an apparatus to prevent machine components from interfering with sliding the machine on the edge of a raised surface. It would be further advantageous if such a lifting apparatus could provide a convenient gripping means for lifting the machine.

BRIEF DESCRIPTION OF THE INVENTION

Embodiments of the invention are directed to a lifting apparatus for an engine-powered, wheeled machine and method of manufacturing thereof, with the lifting apparatus facilitating loading and unloading of the engine-powered, wheeled machine to and from raised platforms.

In accordance with one aspect of the invention, an apparatus for loading an engine-powered, wheeled machine includes a handle assembly having a first arm and a second arm, a first side support member having a first end sized to receive the first arm of the handle assembly, a second side support member having a first end sized to receive the second arm of the handle assembly, a pair of upper attachment brackets coupled to respective upper portions of the first and second side support members, and a pair of lower attachment brackets coupled to respective lower portions of the first and second side support members. The first and second arms of the handle assembly slidably engage the first and second side support members and are moveable therein between a retracted position and an extended position.

In accordance with another aspect of the invention, an assembly includes a machine, with the machine further including a main body positioned within a housing, a rotating blade positioned within the housing, an axle assembly comprising a pair of wheels coupled to the main body, and a first handle assembly coupled to the main body. The assembly also includes a loading apparatus coupled to the machine, with the loading apparatus further including a first side support member having a plurality of attachment brackets coupled thereto, a second side support member having a plurality of attachment brackets coupled thereto, and a second handle assembly moveable between a retracted position and an extended position. The second handle assembly further includes a first arm coupled to the first side support member, a second arm coupled to the second side support member, and a handle portion positioned between the first arm and the second arm. The assembly further includes a plurality of fasteners coupling the plurality of attachment brackets of the first side support member and the plurality of attachment brackets of the second side support member to the first handle assembly.

In accordance with a further aspect of the invention, a method of manufacturing a machine having a loading apparatus coupled thereto includes providing a machine, with the machine further including a rotating blade positioned within a housing, an axle assembly positioned proximate a back end of the machine, a plurality of wheels coupled to the axle assembly, and a first handle assembly having a pair of side arms positioned proximate the back end of the machine. The method further includes coupling a first side support member to one side arm of the pair of side arms via a first upper attachment bracket and a first lower attachment bracket, coupling a second side support member to the other side arm of the pair of side arms via a second upper attachment bracket and a second lower attachment bracket, and disposing a portion of a second handle assembly within the first and second side support members such that the portion of the second handle assembly is moveable within the first and second side support members between a refracted position and an extended position.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings:

FIG. 1 is a perspective view of an assembly comprising a loading apparatus coupled to an engine-powered, wheeled machine, according to an embodiment of the invention.

FIG. 2 is a side view of the assembly of FIG. 1, according to an embodiment of the invention.

DETAILED DESCRIPTION

Figure 3:
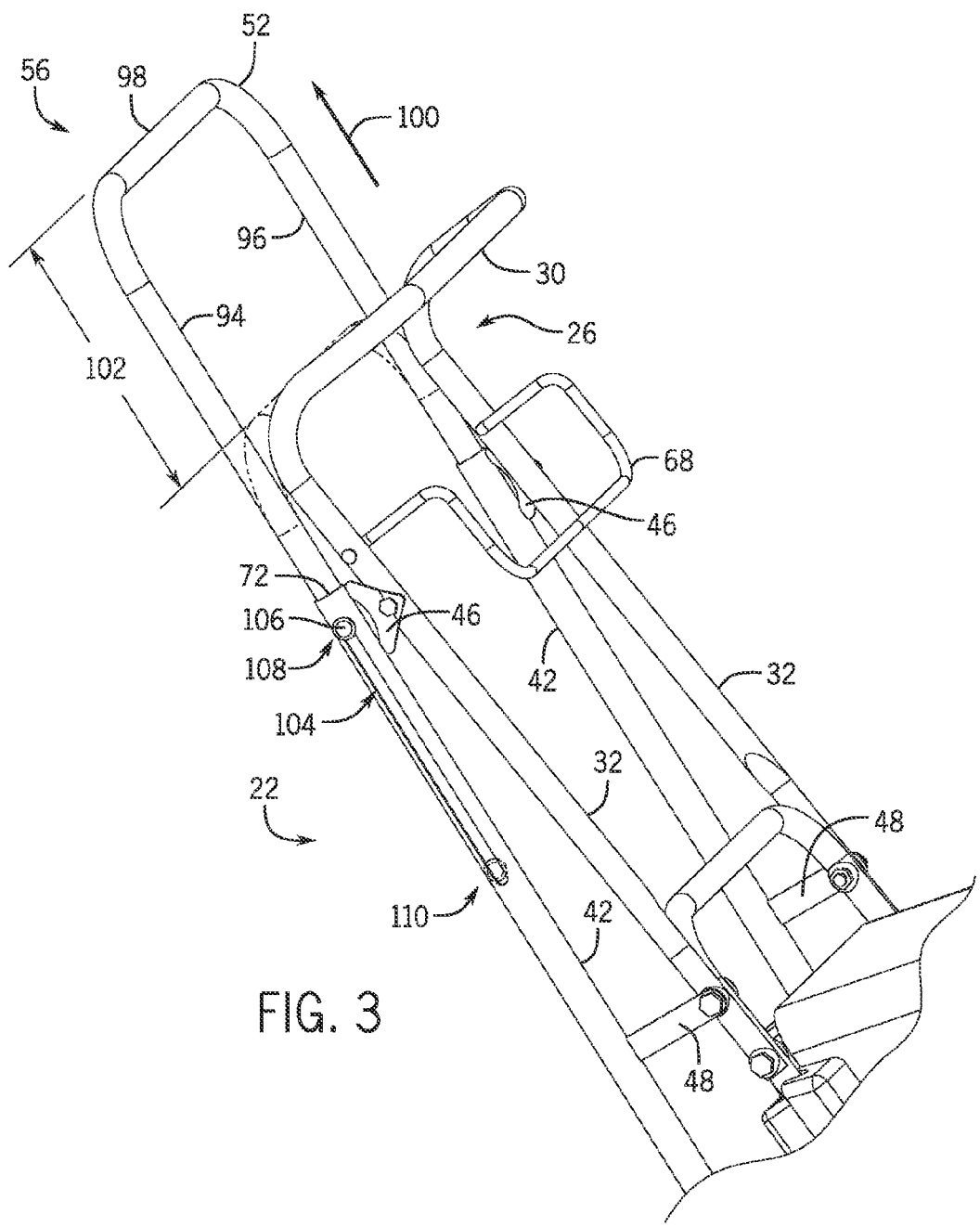
FIG. 3 is a perspective view of a portion of loading apparatus of FIG. 1, illustrating movement of the loading apparatus between retracted and extended positions, according to an embodiment of the invention.

Embodiments of the invention are directed to a loading apparatus coupleable to an engine-powered, wheeled machine. As described in detail below, the loading apparatus aids an operator in manually lifting the machine to and from a raised platform, such as, for example, the back bed of a pickup truck or a raised storage platform, or lifting the machine up and down stairs. While the engine-powered, wheeled machine is illustrated and described herein as a snow blower, one skilled in the art will recognize that the concepts set forth herein are not limited to snow blower technology and may be adapted to operate with a variety of engine-powered wheeled machines, such as, for example, lawnmowers, as well as operating as lifting mechanisms for use with other objects to be lifted. In addition, the particular snow blower configurations described and illustrated herein are not meant to limit the scope of the invention. Those skilled in the art will recognize that the loading apparatus may be constructed to be coupleable and operable with snow blowers and other machines having configurations beyond those specifically described herein, and that such configurations are considered to be within the spirit and scope of the invention.

Referring first to FIGS. 1 and 2, an assembly 20 is shown that includes a loading apparatus 22 coupled to a snow blower 24. As shown, the loading apparatus 22 is coupled to a handle assembly 26 of the snow blower 24. In the embodiment shown, the handle assembly 26 of the snow blower 24 includes two portions: an upper portion 28 that includes a handlebar portion 30 positioned between a pair of side arms 32 and a lower portion 34 connected to the main body 36 of the snow blower 24. The upper portion 28 and lower portion 34 of the handle assembly 26 are coupled together with upper and lower fasteners 38, 40.

As described in detail below, the loading apparatus 22 allows the snow blower 24 to be slid smoothly on the edge of a raised platform to aid in lifting the snow blower 24 while loading and unloading from the raised platform. The loading apparatus 22 includes a pair of side support members 42 positioned below a down-ward facing surface 44 of the handle assembly 26 of the snow blower 24. According to one embodiment, each side support member 42 includes an upper attachment bracket 46 and a lower attachment bracket 48 coupled thereto. The upper attachment brackets 46 couple loading apparatus 22 to the handle assembly 26 of the snow blower 24 using fasteners 50. Fasteners 38 coupled the lower attachment brackets 48 to the handle assembly 26.

Loading apparatus 22 also includes a handle assembly 52 connected to each side support member 42. As described in more detail below with respect to FIG. 3, handle assembly 52 is inserted into openings formed in the side support members 42 and is configured to translate between a retracted position 54 shown in FIGS. 1 and 2 and an extended position 56, which is illustrated in FIG. 3. While in the retracted position 54, the handle assembly 52 is positioned below the handle assembly 26 so as to not interfere with an operator's access to the handle assembly 26 during operation of snow blower 24.

As shown in FIG. 2, the loading apparatus 22 is positioned below the down-ward facing surface 44 of the handle assembly 26 of the snow blower 24 so that components extending outwardly from the back end 58 of the snow blower 24, such as portions of the snow blower housing 60, engine components such as a carburetor 62, or other machine components such as control levers 64 do not extend beyond a downward-facing surface 66 of the loading apparatus 22. As such, loading apparatus 22 prevents these components of the snow blower 24 from being damaged when the snow blower 24 is loaded and unloaded from the raised platform or slid up or down stairs.

According to embodiments of the invention, the upper attachment brackets 46 and the lower attachment brackets 48 are constructed to mate with existing fastener locations of the handle assembly 26 of the snow blower 24, thereby permitting the loading apparatus 22 to be attached to the snow blower 24 using the existing fastener locations and without permanently altering the snow blower 24. Accordingly, to install the loading apparatus 22 on the snow blower 24, an operator would remove a number of existing fasteners provided on the handle assembly 26, align fastener openings in the upper attachment bracket 46 and lower attachment bracket 48 with corresponding openings in the handle assembly 26, and couple the side support members 42 to the handle assembly 26 using either the existing fasteners from the snow blower 24, new fasteners, or a combination thereof.

In one embodiment, the lower attachment brackets 48 are sized to be longer than the upper attachment brackets 46 such that the lower portion of the loading apparatus 22 is offset from the handle assembly 26 of the snow blower 24 by a distance that positions the downward-facing surface 66 of the loading apparatus 22 below the components of the snow blower 24 while the upper portion of the loading apparatus 22 is positioned proximate the handle assembly 26 so as to not interfere with the operator's body during operation of snow blower 24. In one non-limiting embodiment, the lower attachment brackets 48 are approximately four inches long, however, one skilled in the art will recognize that this distance may be varied for different snow blower configurations.

In one embodiment, the upper attachment brackets 46 and the lower attachment brackets 48 are constructed as flanges that are coupled to a respective side support member 42 via a weld joint or other known mechanical coupling means and extend outward from the side support member 42. The upper and lower attachment brackets 46, 48 include openings configured to receive respective fasteners 50, 38 to connect the attachment brackets 46, 48 to the handle assembly 26. According to various embodiments, the upper and lower attachment brackets 46, 48 may be positioned either to couple side support members 42 substantially in line with handle assembly 26 of snow blower 24 or to position the side support members 42 outwards from the handle assembly 26 providing operating room for a control bar or control lever 68 connected to the handle assembly 26.

Figure 10:
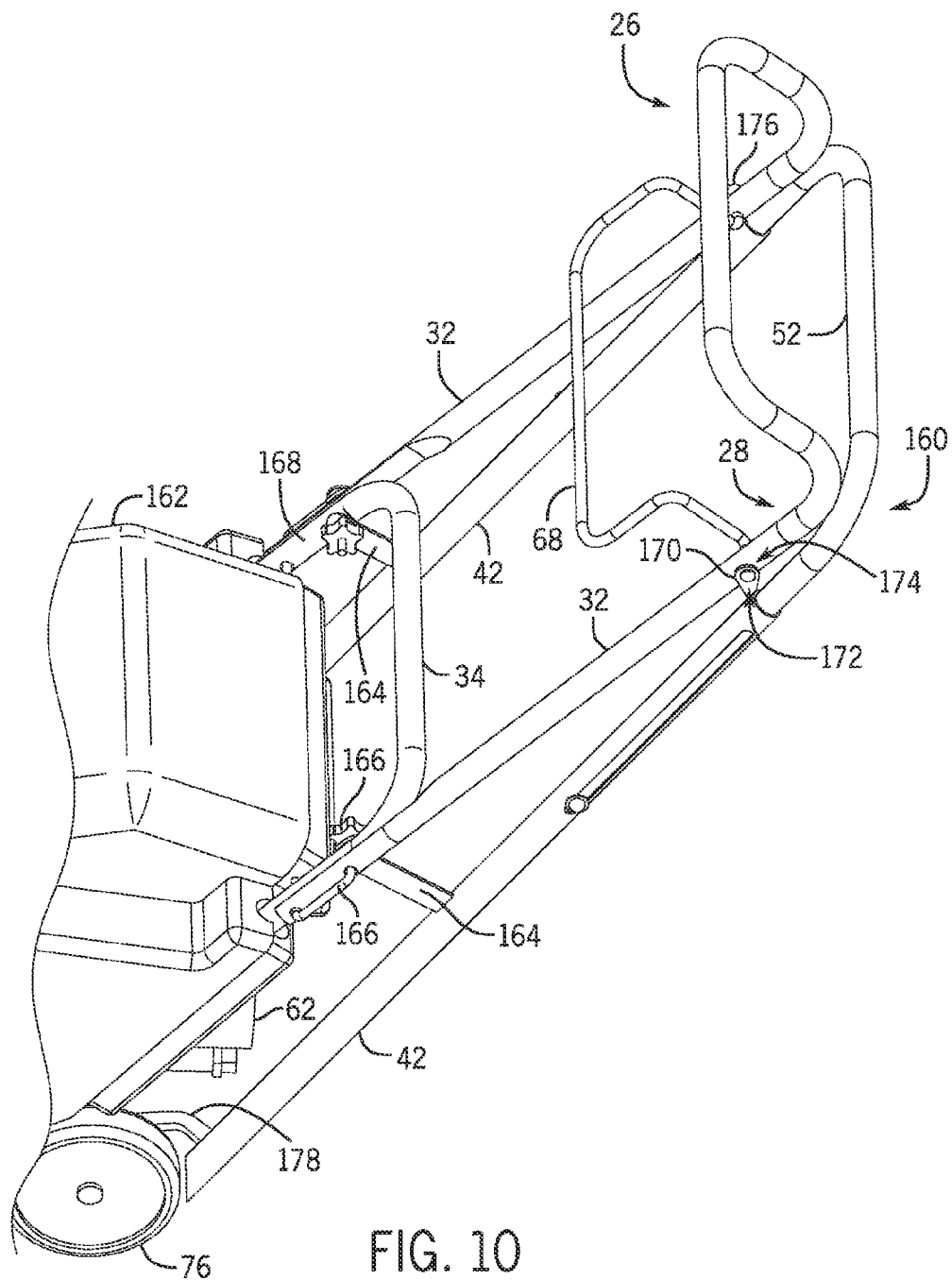
FIG. 10 is a perspective view of a loading apparatus coupled to an engine-powered, wheeled machine, according to another embodiment of the invention.

While upper attachment brackets 46 are both described above as being constructed as a flange used to couple side support members 42 to handle assembly 26 with a fastener, one or both of upper attachment brackets 46 may be constructed to receive the end of snow blower control bar 68, thereby eliminating the use of a separate fastener, as described in additional detail with respect to the embodiment of FIG. 10.

In order to accommodate different sized machines, one skilled in the art will recognize that the upper attachment brackets 46 and lower attachment brackets 48 may be constructed with lengths corresponding to a desired offset between the side support members 42 and handle assembly 26. Optionally, lower attachment bracket 48 may be provided with multiple fastener openings 70 (shown in phantom) formed along the length of the lower attachment bracket 48, which allow the position of side support members 42 to be adjusted. Alternatively, the lower attachment bracket 48 itself may be constructed to be adjustable in length, such as, for example, using two or more overlapping flanges that may be coupled together in varying manners to adjust the overall length of the attachment bracket.

While each of the side support members 42 of loading apparatus 22 are described above as including an upper attachment bracket 46 and a lower attachment bracket 48, the side support members 42 may be provided with a single attachment bracket in alternative embodiments to fasten the loading apparatus 22 to the snow blower 24. In such an alternative embodiment, the single attachment bracket may be provided with two or more openings for fasteners in order to rigidly attach the single attachment bracket to the handle assembly 26.

As illustrated in FIG. 2, the side support members 42 of loading apparatus 22 have an upper end 72 and a lower end 74, with the upper end 72 positioned proximate to the handle assembly 26 of the snow blower 24 and the lower end 74 positioned proximate to the wheels 76 of the snow blower 24. According to one embodiment, the lower end 74 of each side support member 42 is a pointed end having a solid flat surface that is oriented at an acute angle 78 to the downward-facing surface 66 of the respective side support member 42. The angle of the bottom surface 74 places both the lower edge 80 of the downward-facing surface 66 and the upper edge 82 in close proximity to the wheels 76 and helps prevent snow (or clumps of mown grass in embodiments where the loading apparatus 22 is coupled to a lawnmower) from building up on the wheels 76. In an alternative embodiment, the lower end 74 of the side support members 42 is a flat surface oriented substantially perpendicular to the downward-facing surface 66 of side support members 42. In either embodiment, the downward-facing surface 66 is substantially aligned with the outer edge of the wheels 76, as shown in FIG. 2, such that the weight of the snow blower 24 can be smoothly transitioned among the side support members 42 and the wheels 76 when loading or unloading the snow blower 24 or when transitioning the snow blower 24 up or down stairs.

While FIG. 1 shows two side support members 42 substantially parallel to each other, one skilled in the art will recognize that the plurality of side support members 42 may be positioned in alternative configurations to accommodate different handle assembly 26 designs. Additionally, loading apparatus 22 may include a single side support member in an alternative embodiment, rather than a plurality of side support members 42.

According to various embodiments, the components of the loading apparatus 22 may be made from metal, plastic, fiberglass, graphite, or other materials well known in the art and combinations thereof. In one embodiment, the side support members 42 and the handle assembly 52 are hollow tubes. However, embodiments of the invention may include side support members 42 and a handle assembly 52 constructed of a solid material or materials having other cross-sectional shapes. In one exemplary embodiment, the loading apparatus 22 is made of material having sufficient strength to support a 90 pound machine when loaded on one or both of the side support members 42.

Assembly 20 may include an optional handle 84 (shown in phantom) mounted to the housing 60 at a location accessible from the front end 86 of the snow blower 24. The optional handle 84 permits an operator loading or unloading the snow blower 24 to lift or lower the snow blower 24 without placing his or her hands at a position proximate the rotating blade 88 positioned within the housing 60 and to support the front end 86 of the snow blower 24 while the back end 58 of the snow blower 24 is supported by the loading apparatus 22. According to one embodiment the optional handle 84 is mounted on a top panel 90 of the housing 60, as shown in FIGS. 1 and 2. Alternatively, the optional handle 84 may include a pair of handle portions mounted to outside facing surfaces of opposing side panels 92 of the housing 60.

Referring now to FIG. 3, operation of loading apparatus 22 from the retracted position 54 illustrated in FIGS. 1 and 2 to the extended position 56 is described. As shown, the handle assembly 52 includes a first arm 94 and a second arm 96 and a central member or handle portion 98, with the first arm 94 and second arm 96 extending substantially perpendicular from the central member 98. In one embodiment, the handle assembly 52 is constructed from a single tube bent in two locations to form the first arm 94, the second arm 96, and the central member 98.

In the embodiment illustrated in FIG. 3, the side support members 42 are hollow tubes adapted to receive the first arm 94 and second arm 96 of the handle assembly 52. The first arm 94 and second arm 96 have an outer diameter that fits within the inner diameter of the side support members 42 and can slide in relation to the upper end 72 of the side support members 42. Clearance between the two diameters may be limited to introduce a frictional element to aid in retaining the handle assembly 52 in an extended or retracted position and may also prevent the handle assembly 52 from rattling during operation of the snow blower 24.

As shown, the first arm 94 and second arm 96 are moveable within respective side support members 42 permitting the handle assembly 52 to translate in the direction of arrow 100 between the retracted position 54 and the extended position 56. The distance 102 within which the handle assembly 52 translates when moving between the retracted position 54 and the extended position 56 is defined by the length of a slot or sliding track 104 formed in one or both of the side support members 42. According to exemplary embodiments, distance 102 may be a length within a range of approximately 8 to 15 inches. However, one skilled in the art will recognize that the distance 102 may be selected to be any value as desired based on design specifications. As shown, sliding track 104 is positioned at a location proximate the upper end 72 of the side support members 42.

Constraining mechanisms 106 or fasteners are coupled to one or both of the first arm 94 and the second arm 96 of the handle assembly 52 and travel along the length of the sliding track(s) 104 during refraction or extension of the handle assembly 52. Engagement of the constraining mechanisms 106 within the sliding track 104 serves to restrain the motion of the handle assembly 52 between the refracted position 54 and the extended position 56. The constraining mechanisms 106 may also frictionally engage the sides of the sliding track 104 to aid in maintaining the handle assembly 52 in either the retracted position 54 or the extended position 56. According to one embodiment, constraining mechanisms 106 are screws or bolts inserted within openings formed in the side support members 42. The constraining mechanisms 106 may include a washer, such as a spring or lock washer that frictionally engages the sides of the sliding track 104 when the constraining mechanism 106 is tightened down against the side support members 42.

When the handle assembly 52 is in the extended position 56, constraining mechanism 106 is positioned proximate a first end 108 of the sliding track 104. Conversely, when the handle assembly 52 is in the retracted position 54, constraining mechanism 106 is positioned proximate a second end 110 of the sliding track 104. According to embodiments of the invention, a fastener, such as a clasp mechanism (not shown) may be provided to lock the handle assembly 52 in the extended position 56 and the retracted position 54.

While the embodiment described above discloses the handle assembly 52 as being received within the ends of the side support members 42, the handle assembly 52 and the side support members 42 may be sized in an alternative embodiment such that the side support members 42 are inserted within the openings formed in the ends of the first arm 94 and the second arm 96. In such an embodiment, the sliding track 104 may be formed within first arm 94 and second arm 96 and the attachment brackets connecting loading apparatus 22 to snow blower 24 arranged so as to not interfere with movement of first and second arms 94, 96 along the outer surface of side support members 42.

Figure 4:
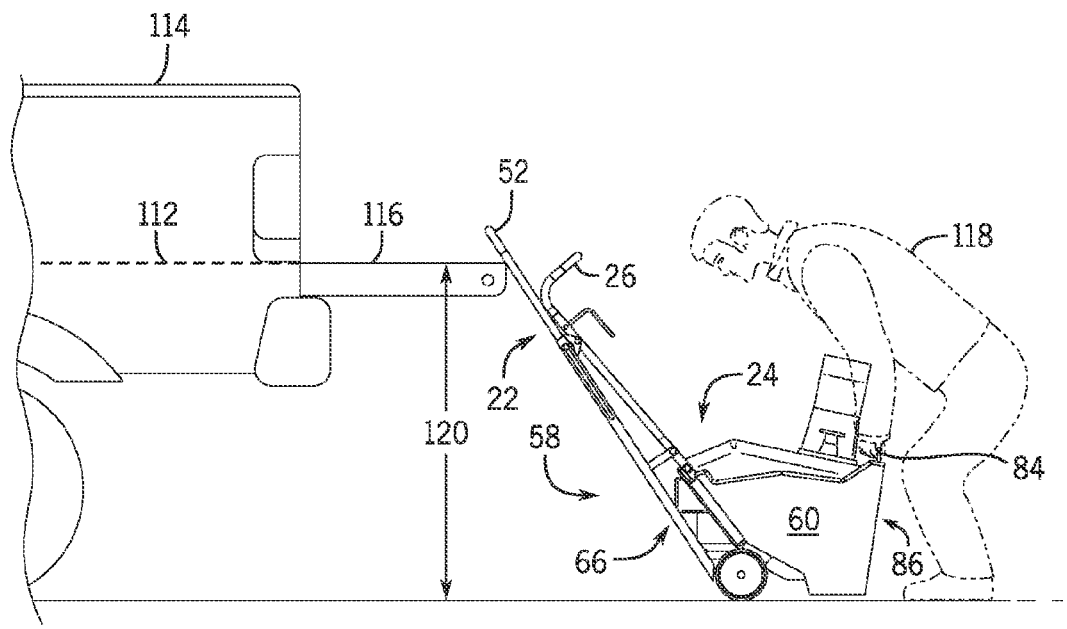
FIGS. 4 and 5 are side views illustrating an operator loading an engine-powered, wheeled machine onto the bed of a pickup truck with the aid of the loading apparatus of FIG. 1, according to an embodiment of the invention.
Figure 5:
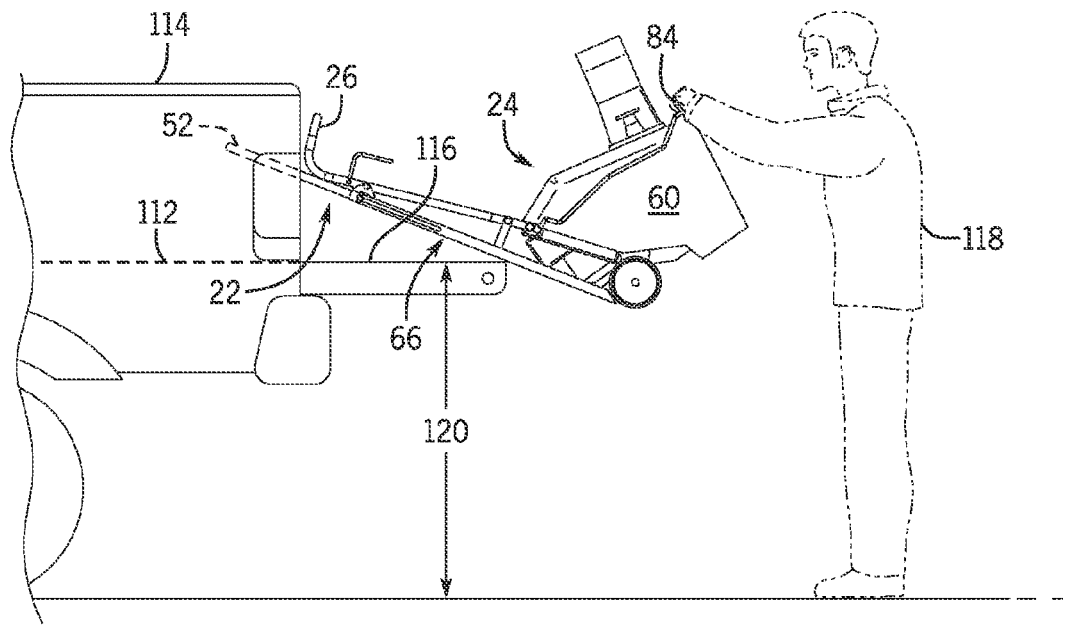

FIG. 4 and FIG. 5 illustrate the steps of loading a snow blower 24 onto the back gate or bed 112 of a pickup truck 114 with the aid of a loading apparatus 22 coupled to the snow blower 24. To load the snow blower 24, the tailgate 116 is opened and the back end 58 of the snow blower 24 is positioned facing the tailgate 116. The handle assembly 52 of the loading apparatus 22 is positioned in the extended position 56 and the snow blower 24 is positioned near the tailgate 116 such that the handle assembly 52 rests on the tailgate 116. The operator 118 grasps front end 86 of the snow blower 24, either using the optional handle 84 or a portion of the housing 60 of the snow blower 24 proximate the front end 86 of the snow blower 24. As the operator lifts the snow blower 24, a portion of the weight of the snow blower 24 is supported by the loading apparatus 22 resting on the tailgate 116. As the snow blower 24 is loaded onto the tailgate 116, the downward-facing surface 66 of the side support members 42 of the loading apparatus 22 slide along the edge of the tailgate 116, as shown in FIG. 5. Once loaded, the snow blower 24 may be tipped into an upright position.

To unload the snow blower 24, the front end 86 of snow blower 24 is positioned facing the tailgate 116 and the handle assembly 52 positioned in the extended position 56. After opening the tailgate 116, the operator 118 may either stand on the bed 112 of the pickup truck 114 and grasp handle assembly 52 or stand on the ground and grasp the optional handle 84 or another location proximate the front end 86 of the snow blower 24. The operator 118 positions the snow blower 24 so that a portion of downward-facing surface 66 of the side support members 42 adjacent wheels 76 rests on the tailgate 116. The snow blower 24 is lowered to the ground by sliding the loading apparatus 22 along the tailgate 116 until the wheels 76 contact the ground. The handle assembly 52 is positioned in the retracted position 54 prior to operating the snow blower 24.

One skilled in the art will recognize that the above-described steps of loading and unloading the snow blower 24 from the bed of a pickup truck 114 using the loading apparatus 22 may be easily translated to loading and unloading engine-powered, wheeled machines onto and off of other platforms, such as, for example, the beds of trailers or storage platforms. Further, loading apparatus 22 may be used to facilitate moving the snow blower 24 up and down stairs by sliding the downward-facing surface 66 of the side support members 42 along the edges of the stairs.

As shown in FIG. 4, the handle assembly 52 is constructed to extend to a height at least equal to the height 120 of a pickup truck bed when positioned in the extended position 56. In one non-limiting and exemplary embodiment, the handle assembly 52 extends to a height greater than 40 inches off the ground to permit the snow blower 24 to be loaded into a pickup truck such as a Ford F-450.

Figure 6:
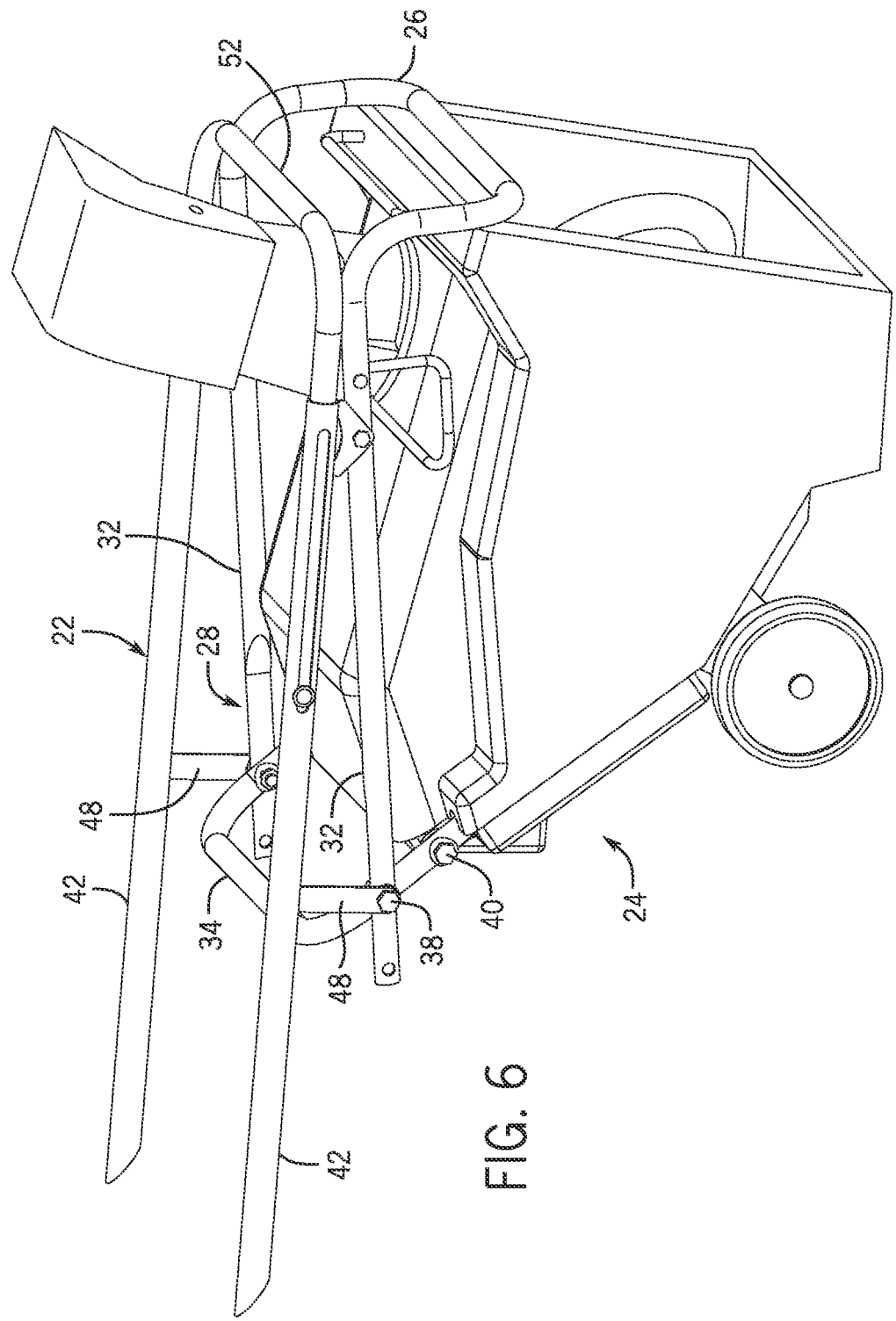
FIG. 6 is a perspective view of the assembly of FIG. 1 arranged in a folded position for storage, according to an embodiment of the invention.

FIG. 6 depicts the snow blower 24 and the loading apparatus 22 of FIGS. 1-3 in a folded position, such as for storage. In this position, the lower fasteners 40 of the handle assembly 26 are removed from the upper portion 28 of the handle assembly 26 and the upper fasteners 38 are loosened to permit the handle assembly 26 and loading apparatus 22 to pivot down into a storage position. When in this position, the lower fasteners 40 may be inserted into just the lower portion 34 of the handle assembly 26 of the snow blower 24 for temporary storage.

Figure 7:
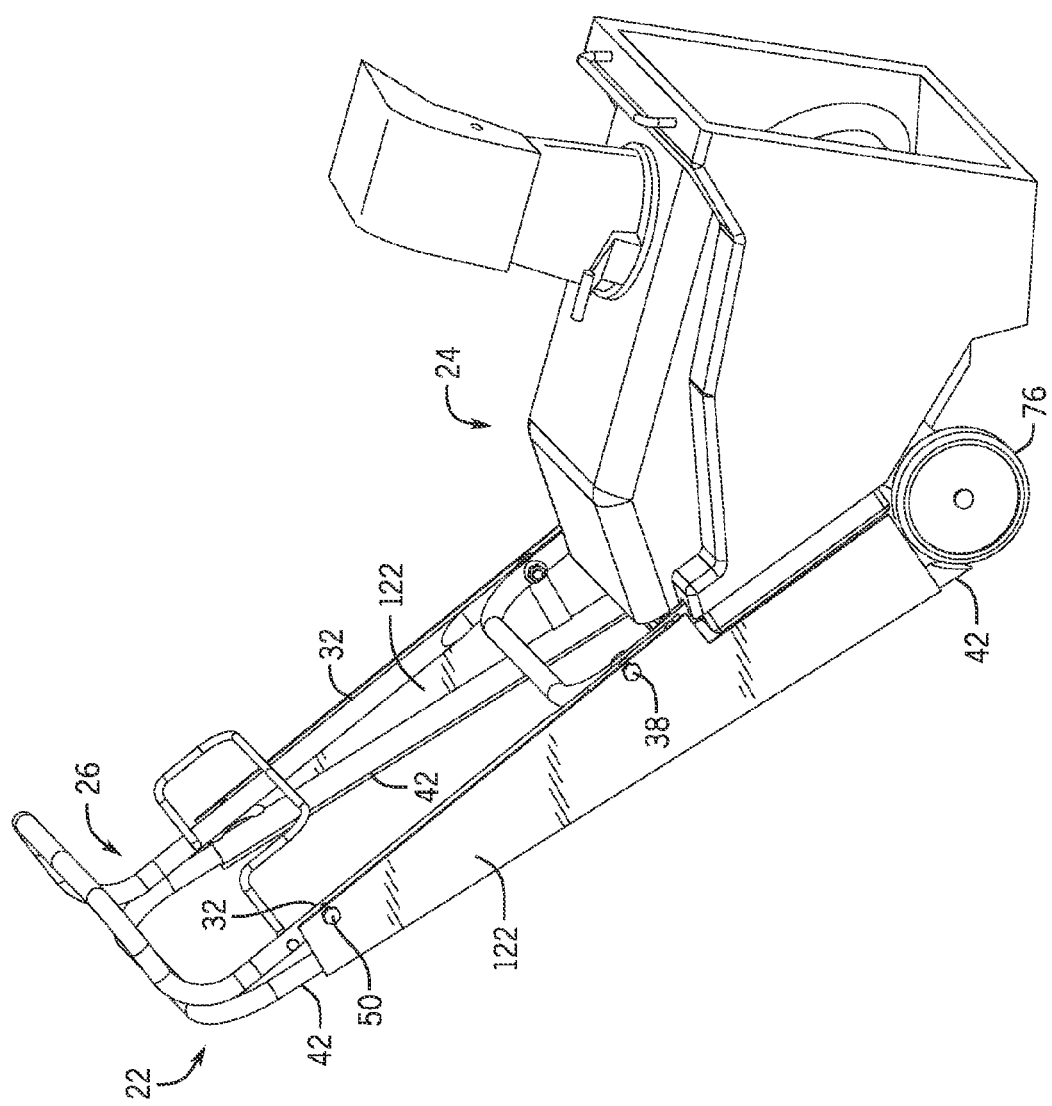
FIG. 7 is a perspective view of an assembly that includes an engine-powered, wheeled machine and a loading apparatus having side panels, according to an embodiment of the invention.

Referring now to FIG. 7, the lift mechanism 22 may include one or more side panels 122, according to an embodiment of the invention. As shown, each side panel 122 is coupled between a side support member 42 and a corresponding arm 32 of the handle assembly 26 of the snow blower 24. In a preferred embodiment, the side panels 122 are made of plastic, however, the side panels 122 may be made of other materials, such as metal, in alternative embodiments. As shown, the side panels 122 may include a plurality of openings formed therein provided to receive fasteners 38, 50 to couple the side panels 122 to the handle assembly 26. Alternatively or in addition thereto, the side panels 122 may be coupled to the side support members 42 of loading apparatus 22 or the handle assembly 26 of the snow blower 24 using other fasteners or clips (not shown). The side panels 122 may extend substantially to the snow blower wheels 76 and may be shaped to span the space between the handle assembly 26 and the loading apparatus 22.

Figure 8:
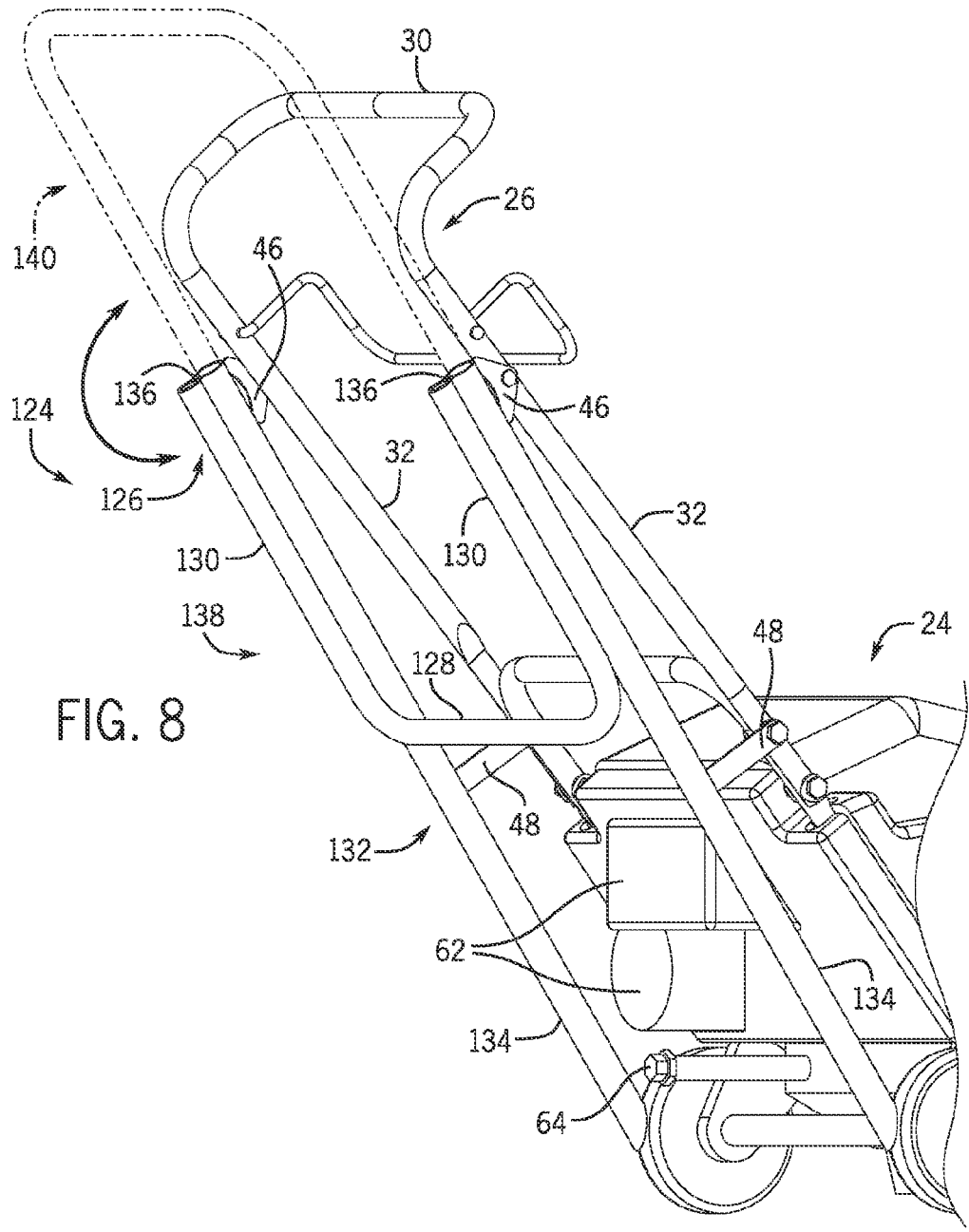
FIG. 8 is a perspective view of a loading apparatus having a handle assembly which folds into a retracted position, according to another embodiment of the invention.

FIG. 8 shows a loading apparatus 124 for an engine-powered, wheeled machine such as a snow blower 24, according to an alternative embodiment. As shown, the loading apparatus 124 includes an upper portion 126 having a handle portion 128 positioned between a pair of upper side support members 130 and a lower portion 132 including a pair of lower side support members 134. Each of the lower side support members 134 are attached to a respective side arm 32 of the handle assembly 26 of the snow blower 24 by lower attachment bracket 48 and an upper attachment bracket 46, similar to loading apparatus 22 (FIG. 1).

The upper and lower side support members 130, 134 are connected by a hinge 136 that permits the loading apparatus 124 to fold down into a retracted position 138 and fold up into an extended position 140 (shown in dashed lines in FIG. 8). When in the extended position 140, the upper and lower side support members 130, 134 operate together in a similar manner as side support members 42 (FIG. 1) by providing a continuous sliding surface for loading and unloading of the snow blower 24 onto and off of a raised platform. In one embodiment, the pair of upper side support members 130 may be retained in the extended position 140 and retracted position 138 by a locking mechanism, such as, for example, one or more clips (not shown).

Figure 9:
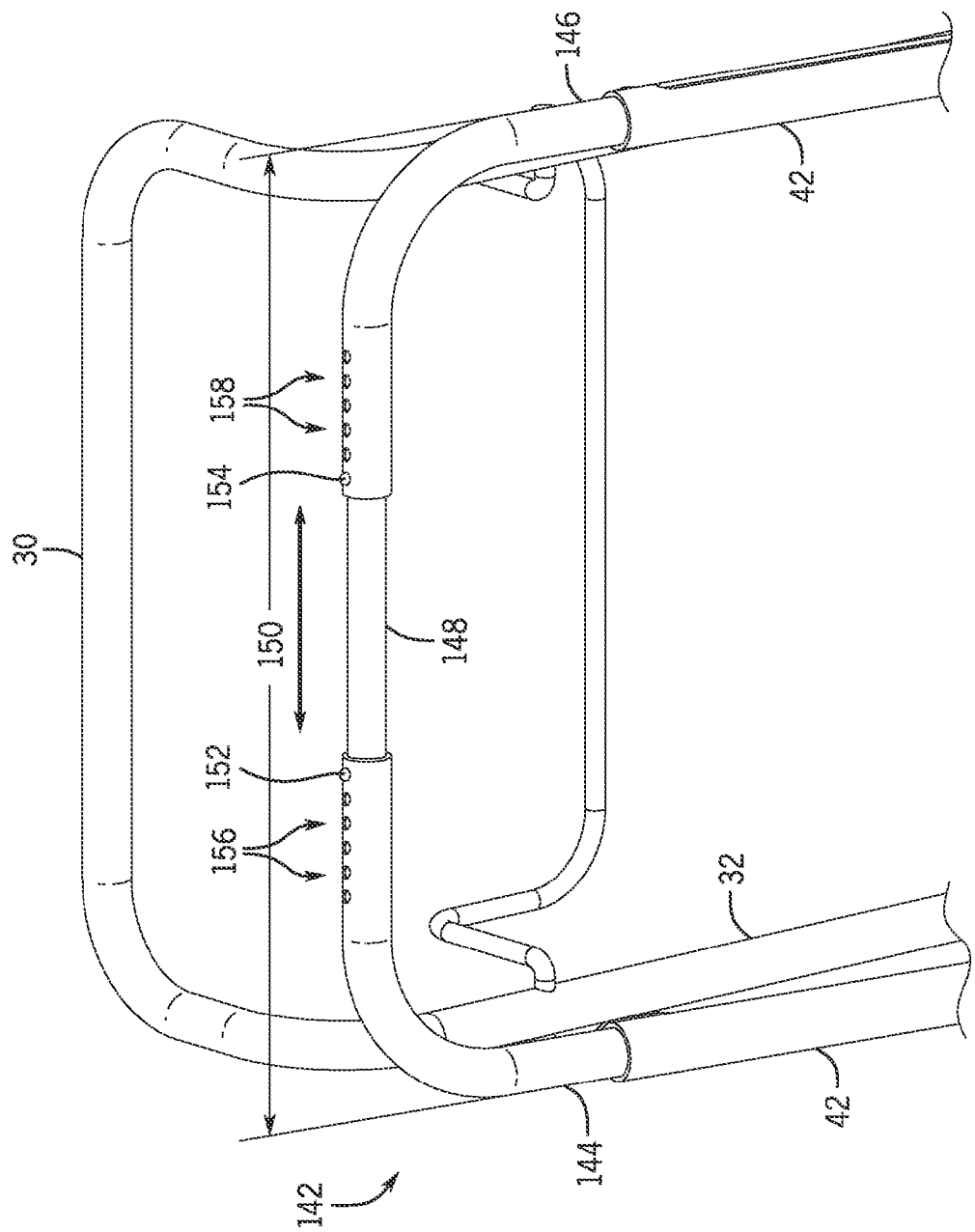
FIG. 9 is a perspective view of a handle assembly of a loading apparatus having an adjustable width, according to another embodiment of the invention.

Referring now to FIG. 9, an adjustable handle assembly 142 for a loading apparatus, such as loading apparatus 22 (FIG. 1) is illustrated according to an embodiment of the invention. Handle assembly 142 includes a first arm 144, a second arm 146, and a handle portion 148 positioned between arms 144, 146. In the embodiment shown, first and second arms 144, 146 are shown inserted into the side support members 42 of loading apparatus 22 (FIG. 1), however, the first and second arms 144, 146 may be configured to attach to a pair of lower side support members 134 in a similar manner as described with respect to loading apparatus 124 (FIG. 8) in an alternative embodiment.

As shown in FIG. 9, the width 150 of the handle assembly 142 between the first arm 144 and the second arm 146 may be adjusted by positioning spring-loaded buttons 152, 154, which are provided on the handle portion 148, in one of a series of openings 156, 158 formed in the first and second arms 144, 146. In an alternative embodiment, the handle assembly 142 may be provided with a single spring-loaded button and corresponding series of openings, rather than two spring-loaded buttons and openings as shown in FIG. 9. The adjustable handle assembly 142 allows the loading apparatus 22 to be coupled to different sized snow blowers 24 or machines.

Figure 11:
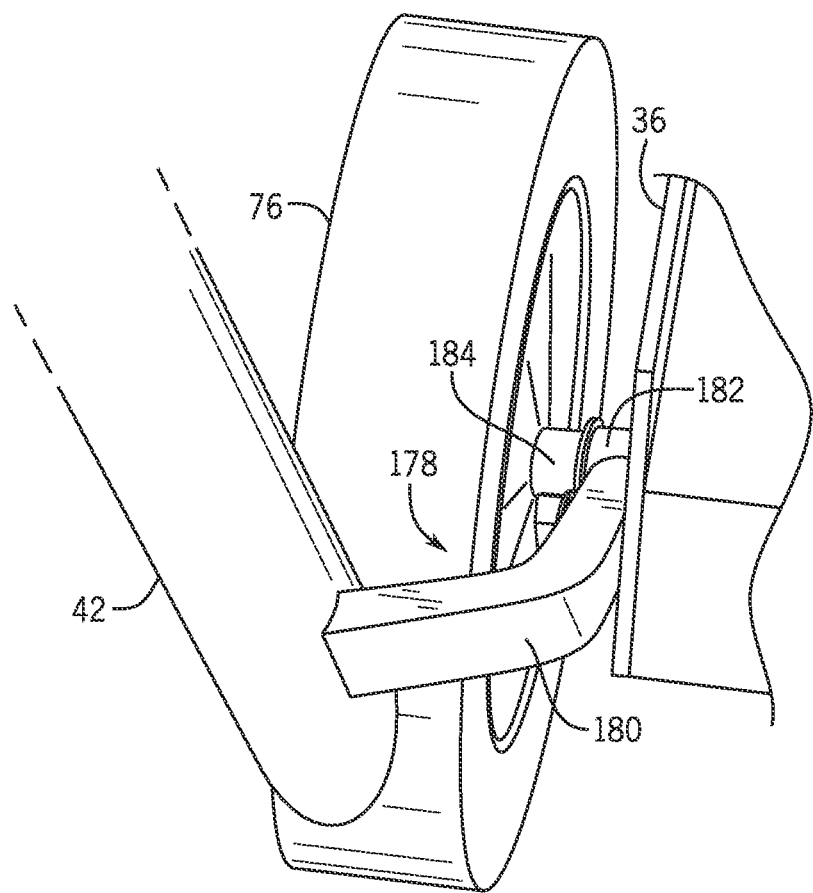
FIG. 11 illustrates an attachment bracket of the loading apparatus of FIG. 10 coupled to an axle assembly of the engine-powered, wheeled machine, according to an embodiment of the invention.

FIGS. 10 and 11 show a loading apparatus 160 for an engine-powered, wheeled machine such as a snow blower 162, according to another embodiment of the invention. Elements and components common to loading apparatus 160 and loading apparatus 22 (FIG. 1) as well as snow blower 24 and snow blower 162 will be discussed relative to the same part numbers as appropriate below.

As shown, the loading apparatus 160 includes lower attachment brackets 164 that couple the side support members 42 to the handle assembly 26 of the snow blower 24 at a location on the lower portion 34 of the handle assembly 26. As shown, the upper portion 28 and the lower portion 34 of the handle assembly 26 of the snow blower 162 are attached to one another using a fastener assembly 166 that differs from the upper and lower fasteners 38, 40 of the snow blower 24 (FIG. 1). To accommodate the fastener assembly 166, the lower attachment brackets 164 of the loading apparatus 160 are positioned on the side support members 42 such that they attach to an inside surface 168 of the lower portion 34 of the handle assembly 26.

Loading apparatus 160 also includes a first upper attachment bracket 170 having an opening 172 formed therein at a location aligned with an opening 174 on the side arm 32 that receives the control bar 68. To assemble the loading apparatus 160 onto the snow blower 162, the snow blower control bar 68 is removed from the opening 174 and reinserted through both the opening 172 of the first upper attachment bracket 170 and the opening 174 of the side arm 32. In one embodiment, the control bar 68 may secure the upper attachment bracket 170 to the handle assembly 26 of the snow blower 162 without a separate fastener. Loading apparatus 160 further includes a second upper attachment bracket 176 positioned on the opposing side arm 32, which may be configured in a similar manner as the first upper attachment bracket 170 or similar to the upper attachment bracket 46 (FIG. 1), according to various embodiments.

In addition to the components common with loading apparatus 22, each side support member 42 of loading apparatus 160 includes an axle attachment bracket 178 provided for added robustness of the loading apparatus 160. The axle attachment bracket 178 is coupled to the lower end 74 of a respective side support member 42 using a weld joint or other mechanical fastening means. As shown in additional detail in FIG. 11, the axle attachment bracket 178 includes an angled flange portion 180 and a bushing 182. To assemble the loading apparatus 160 onto snow blower 162, the wheels 76 are temporarily removed so that the axle assembly 184 of the snow blower 162 may be inserted into the bushing 182. When assembled onto the snow blower 162, the bushing 182 is positioned on the axle assembly 184 of the snow blower 162 at a location between the wheels 76 and the main body 36 of the snow blower 162. In one embodiment, spacing for the axle attachment bracket 178 on the axle assembly 184 is made by removing of an OEM engine guard (not shown) originally provided on the snow blower 162. Since the side support members 42 of the loading apparatus 160 extend beyond the engine components 62, the loading apparatus 160 may be configured to provide desired protection for the engine components 62 after the OEM engine guard is removed.

Figure 12:
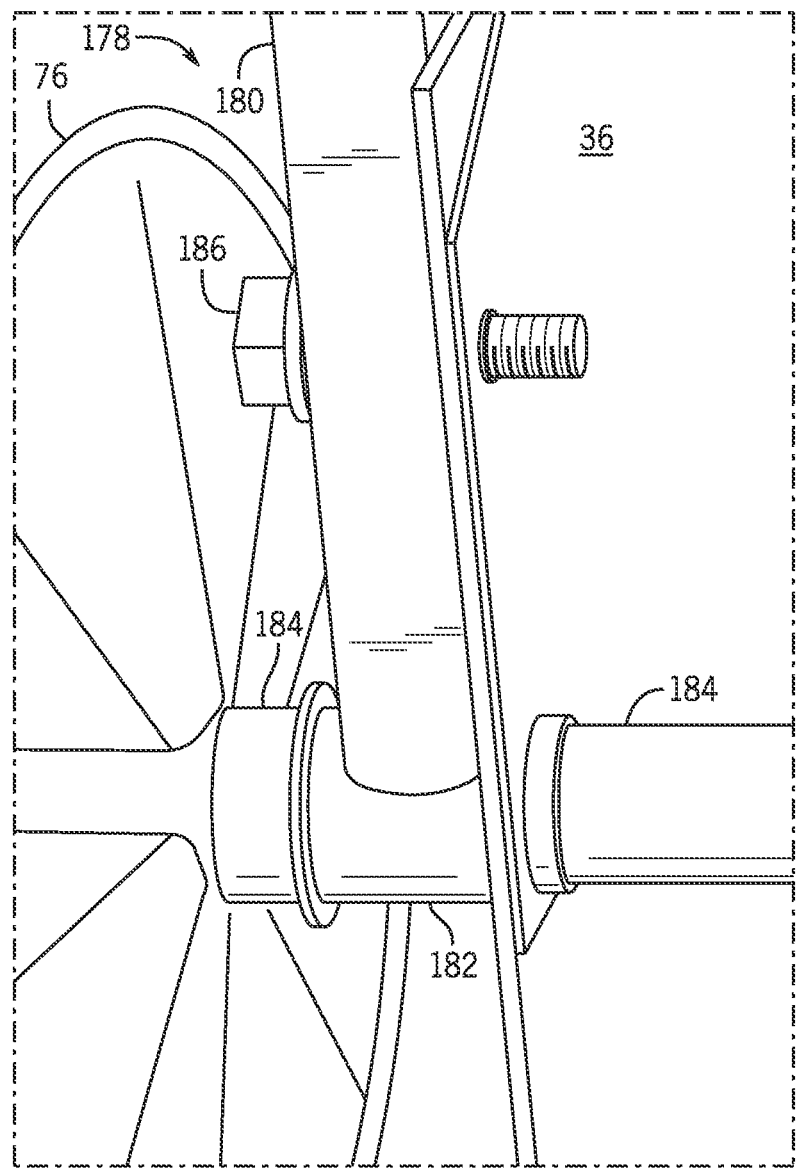
FIG. 12 is a bottom view of a portion of the attachment bracket of FIG. 10.

Referring now to FIG. 12, a bottom view of a portion of the axle attachment bracket 178 of FIG. 11 is provided. As shown, the flange portion 180 of axle attachment bracket 178 is coupled to the main body 36 of the snow blower 162 (FIG. 10) using a fastener 186. Similar to that described above with respect to the upper and lower attachment brackets, the fastener may be received within an existing fastener opening of the main body 36 of the snow blower, thereby permitting loading apparatus 160 to be coupled to the snow blower 162 without permanently modifying the main body 36 of the snow blower 162. In alternative embodiments, fastener 186 may be omitted.

The loading apparatus described above facilitate loading and unloading engine-powered, wheeled machines such as snow blowers or lawn mowers to and from transport vehicles and storage platforms and up and down stairs. Embodiments of the loading apparatus disclosed herein may be configured to be assembled onto a machine such as a snow blower without making any permanent modifications to the OEM configuration of the snow blower. As such, the loading apparatus disclosed above may be provided as a retrofit kit easily assembled onto an existing snow blower or other machine. Alternatively, one skilled in the art will recognize that a snow blower or other machine may be manufactured with an integrated loading apparatus having similar functionality to the loading apparatus described herein.

Therefore, according to one embodiment of the invention, an apparatus for loading an engine-powered, wheeled machine includes a handle assembly having a first arm and a second arm, a first side support member having a first end sized to receive the first arm of the handle assembly, a second side support member having a first end sized to receive the second arm of the handle assembly, a pair of upper attachment brackets coupled to respective upper portions of the first and second side support members, and a pair of lower attachment brackets coupled to respective lower portions of the first and second side support members. The first and second arms of the handle assembly slidably engage the first and second side support members and are moveable therein between a retracted position and an extended position.

According to another embodiment of the invention, an assembly includes a machine, with the machine further including a main body positioned within a housing, a rotating blade positioned within the housing, an axle assembly comprising a pair of wheels coupled to the main body, and a first handle assembly coupled to the main body. The assembly also includes a loading apparatus coupled to the machine, with the loading apparatus further including a first side support member having a plurality of attachment brackets coupled thereto, a second side support member having a plurality of attachment brackets coupled thereto, and a second handle assembly moveable between a retracted position and an extended position. The second handle assembly further includes a first arm coupled to the first side support member, a second arm coupled to the second side support member, and a handle portion positioned between the first arm and the second arm. The assembly further includes a plurality of fasteners coupling the plurality of attachment brackets of the first side support member and the plurality of attachment brackets of the second side support member to the first handle assembly.

According to yet another embodiment of the invention, a method of manufacturing a machine having a loading apparatus coupled thereto includes providing a machine, with the machine further including a rotating blade positioned within a housing, an axle assembly positioned proximate a back end of the machine, a plurality of wheels coupled to the axle assembly, and a first handle assembly having a pair of side arms positioned proximate the back end of the machine. The method further includes coupling a first side support member to one side arm of the pair of side arms via a first upper attachment bracket and a first lower attachment bracket, coupling a second side support member to the other side arm of the pair of side arms via a second upper attachment bracket and a second lower attachment bracket, and disposing a portion of a second handle assembly within the first and second side support members such that the portion of the second handle assembly is moveable within the first and second side support members between a refracted position and an extended position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for loading an engine-powered, wheeled machine, the apparatus comprising:
    a handle assembly having a first arm and a second arm;
    a first side support member having a first end sized to receive the first arm of the handle assembly and a second end opposite the first end;
    a second side support member having a first end sized to receive the second arm of the handle assembly and a second end opposite the first end;
    a pair of upper attachment brackets coupled to respective upper portions of the first and second side support members; and
    a pair of lower attachment brackets coupled to respective lower portions of the first and second side support members;
    wherein the first and second arms of the handle assembly slidably engage the first and second side support members and are moveable therein between a retracted position and an extended position;
    wherein the first and second ends of the first side support member are aligned coaxially;
    wherein the first and second ends of the second side support member are aligned coaxially;
    wherein one lower attachment bracket of the pair of lower attachment brackets is positioned between the first and second ends of the first side support member; and
    wherein the other lower attachment bracket of the pair of lower attachment brackets is positioned between the first and second ends of the second side support member.

2. The apparatus of claim 1 further comprising a constraining mechanism coupled to the first arm and positioned to extend through a slot formed in the first side support member proximate the first end of the first side support member;
    wherein the constraining mechanism is positioned proximate a first end of the slot in the extended position; and
    wherein the constraining mechanism is positioned proximate a second end of the slot in the retracted position.

3. The apparatus of claim 1 further comprising a pair of side panels, wherein one panel of the pair of side panels is coupled to the first side support member and the other panel of the pair of side panels is coupled to the second side support member.

4. The apparatus of claim 1 wherein a lower attachment bracket of the pair of lower attachment brackets comprises a flange having a first end and a second end, the first end fixedly coupled to one of the first side support member and the second side support member and the second end having an opening formed therein to receive a fastener.

5. The apparatus of claim 1 wherein a bottom surface of the first side support member is oriented at an acute angle to a downward facing surface of the first side support member.

6. The apparatus of claim 1 wherein a width of the handle assembly between the first arm and the second arm is adjustable.

7. An assembly comprising:
    a machine comprising:
        a main body positioned within a housing;
        a rotating blade positioned within the housing;
        an axle assembly comprising a pair of wheels coupled to the main body; and
        a first handle assembly coupled to the main body and comprising a pair of side arms and a handle positioned therebetween; and
    a loading apparatus coupled to the machine, the loading apparatus comprising:
        a first side support member having a lower attachment bracket and an upper attachment brackets coupled thereto;
        a second side support member having a lower attachment brackets and an upper attachment bracket coupled thereto; and
        a second handle assembly moveable between a retracted position and an extended position, the second handle assembly comprising:
            a first arm coupled to the first side support member;
            a second arm coupled to the second side support member; and
            a handle portion positioned between the first arm and the second arm; and a plurality of fasteners coupling the lower and upper attachment brackets of the first side support member and the lower and upper attachment brackets of the second side support member to the first handle assembly;
wherein the lower attachment brackets of the first and second side support members are coupled to a respective side arm of the first handle assembly proximate a lower end of the respective side arm; and
wherein the upper attachment brackets of the first and second side support members are coupled to a respective side arm of the first handle assembly proximate an upper end of the respective side arm.

8. The assembly of claim 7 wherein the machine comprises one of a snow blower and a lawnmower.

9. The assembly of claim 7 wherein the first and second arms of the second handle assembly slideably engage the first and second side support members and are moveable within the first and second side support members between the retracted position and the expanded position.

10. The assembly of claim 7 further comprising:
a first hinge coupling the first arm to the first side support member; and
a second hinge coupling the second arm to the second side support member; and
wherein the second handle assembly rotates about the first hinge and the second hinge when moving between the retracted position and the extended position.

11. The assembly of claim 7 further comprising a third handle assembly coupled to a front end of the housing of the machine.

12. The assembly of claim 7 wherein the first and second side support members comprise pointed ends.

13. The assembly of claim 7 wherein the first side support member comprises:
an upper end; and
a slot formed in the first side support member proximate the upper end; and
wherein a protrusion is coupled to the first arm and extends through the slot of the first side support member.

14. The assembly of claim 7 wherein the loading apparatus is positioned beneath a downward-facing surface of the first handle assembly.

15. The assembly of claim 7 wherein the machine further comprises a control bar connected to the first handle assembly; and
wherein the upper attachment bracket coupled to the first side support member has an opening formed therein to receive the control bar.

16. The assembly of claim 7 wherein the lower attachment bracket coupled to the first side support member comprises an axle attachment bracket, the axle attachment bracket comprising a bushing positioned about the axle assembly of the machine.

17. A method of manufacturing a machine having a loading apparatus coupled thereto, the method comprising:
providing a machine comprising a rotating blade positioned within a housing, an axle assembly positioned proximate a back end of the machine, a plurality of wheels coupled to the axle assembly, and a first handle assembly positioned proximate the back end of the machine, the first handle assembly having a pair of side arms;
coupling a first side support member to one side arm of the pair of side arms via a first upper attachment bracket and a first lower attachment bracket;
coupling a second side support member to the other side arm of the pair of side arms via a second upper attachment bracket and a second lower attachment bracket; and
disposing a portion of a second handle assembly within the first and second side support members such that the portion of the second handle assembly is moveable within the first and second side support members between a retracted position and an extended position;
wherein the first and second upper attachment brackets are coupled proximate respective upper ends of the pair of side arms; and
wherein the first and second lower attachment brackets are coupled proximate respective lower ends of the pair of side arms.

18. The method of claim 17 further comprising:
aligning an opening in the first lower attachment bracket with a corresponding opening in a side arm of the pair of side arms; and
inserting a fastener through the opening in the first lower attachment bracket and through the corresponding opening in the side arm to couple the side arm to the first handle assembly.

19. The method of claim 17 further comprising inserting the axle assembly of the machine through an axle attachment bracket coupled to the first side support member.

20. The method of claim 17 further comprising coupling the second handle assembly to the first side support member with a constraining member positioned within a slot formed within the first side support member.

21. An assembly comprising:
a machine comprising:
a main body positioned within a housing;
a rotating blade positioned within the housing;
an axle assembly comprising a pair of wheels coupled to the main body; and
a first handle assembly coupled to the main body;
a loading apparatus coupled to the machine, the loading apparatus comprising:
a first side support member having a plurality of attachment brackets coupled thereto;
a second side support member having a plurality of attachment brackets coupled thereto; and
a second handle assembly moveable between a retracted position and an extended position, the second handle assembly comprising:
a first arm coupled to the first side support member;
a second arm coupled to the second side support member; and
a handle portion positioned between the first arm and the second arm; and
a plurality of fasteners coupling the plurality of attachment brackets of the first side support member and the plurality of attachment brackets of the second side support member to the first handle assembly; and
a first hinge coupling the first arm to the first side support member; and
a second hinge coupling the second arm to the second side support member; and
wherein the second handle assembly rotates about the first hinge and the second hinge when moving between the retracted position and the extended position; and
wherein the machine is operable when the second handle assembly is in the retracted position.

22. An assembly comprising:
a machine comprising:
- a main body positioned within a housing;
- a rotating blade positioned within the housing;
- an axle assembly comprising a pair of wheels coupled to the main body; and
- a first handle assembly coupled to the main body; and a loading apparatus coupled to the machine, the loading apparatus comprising:
- a first side support member having a plurality of attachment brackets coupled thereto;
- a second side support member having a plurality of attachment brackets coupled thereto; and
- a second handle assembly moveable between a retracted position and an extended position, the second handle assembly comprising:
  - a first arm coupled to the first side support member;
  - a second arm coupled to the second side support member; and
  - a handle portion positioned between the first arm and the second arm; and a plurality of fasteners coupling the plurality of attachment brackets of the first side support member and the plurality of attachment brackets of the second side support member to the first handle assembly; and wherein the machine further comprises a rotatable control bar connected between opposing side arms of the first handle assembly; and wherein at least one attachment bracket coupled to the first side support member has an opening formed therein to receive the rotatable control bar.

* * * * *